INVENTORS
CARL A. MAXWELL
HAROLD E. ROBERTS
GUY A. LECLAIR
EDWARD CAUDA
BY Richard H. Thomas
ATTORNEY United States Patent Office 3,541,299
Patented Nov. 17, 1970

3,541,299
METHOD OF WELDING DISSIMILAR METALS
Carl A. Maxwell, Darien, Conn., and Harold E. Roberts, Shickshinny, Guy A. Leclair, Mountaintop, and Edward Cauda, West Wyoming, Pa., assignors to Foster Wheeler Corporation, New York, N.Y., a corporation of New York
Filed Sept. 2, 1965, Ser. No. 484,618
Int. Cl. B23k 9/00
U.S. Cl. 219—137
9 Claims

ABSTRACT OF THE DISCLOSURE

A method of welding a tube of an alloy containing zinc to a steel tube sheet without vaporizing the zinc. A silver alloy ring is placed around the tube and on the sheet, and an arc is struck between the sheet and a non-consumable electrode which is passed around the tube at a speed and over a path which bonds the silver alloy of the ring with the tube and the steel without vaporizing the zinc.

---

This invention relates to a development in tungsten arc welding, and in particular to a method for welding together two metals of different compositions having substantially different melting points using the tungsten arc process. The method has particular application in welding admiralty brass tubes to carbon steel tube sheets using a silver alloy filler metal.

Admiralty brass is a commonly used metal for condenser tubes, preheaters, evaporators, and for other applications where high resistance to salt water, fresh water, oil or steam is required. However, in the welding of an alloy such as admiralty brass (70% copper, 28% zinc) to carbon steel, the intense welding heat in the order of 1700° F., that would be required to achieve fusion of the brass into the steel, using the tungsten arc process, causes boiling or sublimation of the zinc (B.P., 1663° F.) and porosity in the brass.

Accordingly, it has been conventional to provide the steel with a bronze overlay and to effect the weld between the brass alloy and the overlay.

To overlay a steel tube sheet with a bronze alloy is expensive, so as an alternative, stainless steel tubes have been used in these highly corrosive applications. However, stainless steel tubes are considerably more expensive than brass tubes, thus making a method for welding brass tubes to a steel tube sheet attractive economically.

The type of joint involved in this invention is one in which a tube is inserted through a tube sheet hole projecting a short distance above what is called the head side of the tube sheet. The weld joint is an annular fillet weld on the head side of the tube sheet effected by rotation of a non-consumable tungsten arc welding electrode around the tube.

In the welding of tubes to a tube sheet, the tungsten arc process is necessary, because of the large mass of the tube sheet. This requires the application of highly localized heat. Such methods as furnace heating or induction heating are found to be impracticable. Also heating with an oxy-acetylene torch is impracticable.

Towards arriving at the development which constitutes the present invention, one early proposal involved the use of a silicon bronze ring disposed around the tube next to the head side surface of the tube sheet. It was felt that with careful dimensioning of the ring and location of the welding electrode, the ring would shield the admiralty brass tube from the intense welding heat of the electrode sufficient to avoid vaporizing the zinc. At the same time, the melting point and other properties of the silicon bronze alloy seemed to make the alloy an ideal filler metal towards achieving the necessary fusion between this alloy and the base metals (the carbon steel of the tube sheet and the admiralty brass of the tubes) to effect the joint.

Although the principle of the shielding the admiralty brass tubes to avoid vaporizing the zinc is correct, the silicon bronze weld joint was difficult to repair, in that temperatures required for repair tended to cause cracking in the weld joint and remaining tube projection, and/or relaxing and damage in adjacent weld joints.

In accordance with the present invention, it is proposed to use a silver alloy filler ring.

Unexpectedly, the silver alloy ring produces an easily repairable non-porous weld of high strength.

It is known to use silver alloys in the brazing of such metals as carbon steel and brass wherein, through furnace heating, or the like, there is a filling of joint surfaces by capillary attraction. The present invention can be distinguished from this known use in that the process is more in the nature of braze welding with little or no filling by capillary attraction, and instead limited flow of the silver alloy into the base metal surfaces, i.e., into the carbon steel and admiralty brass.

In the case of the carbon steel, there probably is no actual fusion, defined as melting together of base metal and filler metal, of the steel and silver alloy, but rather a relaxing of the steel crystal structure and intergranular flow of the silver alloy between the steel crystals. In the case of admiralty brass, there is likely some fusion of the brass and the silver alloy. For the purposes of this application, the bonding in both instances shall be referred to as fusion bonding.

The reason for the fusion bond of the silver alloys and base metals in this invention probably resides in the short duration of heating with the tungsten arc process. Silver alloys are highly fluid when melted, and the intense heat of short duration seems to be optimum for penetration of the silver alloy into the base metal surfaces, without further dispersion by capillary attraction. In other words, the duration of heating seems to be insufficient for capillary flow between the closely fitted base metal tube and tube sheet surfaces.

The invention and advantages thereof will become more apparent upon consideration of the specification and accompanying drawings, in which.

Figure 1:
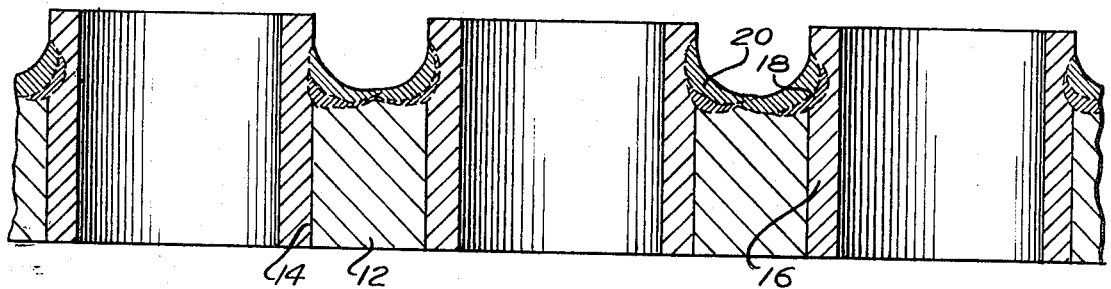
FIG. 1 illustrates a plurality of tube-to-tube sheet welds made in accordance with a known process, between "Monel" metal and steel.
Figure 5:
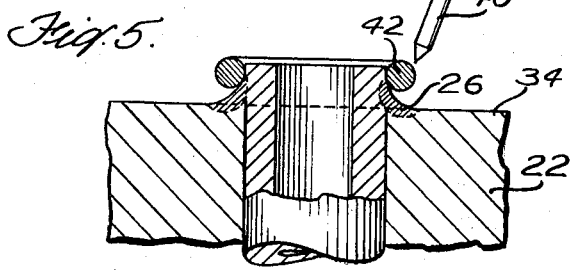
Figure 6:
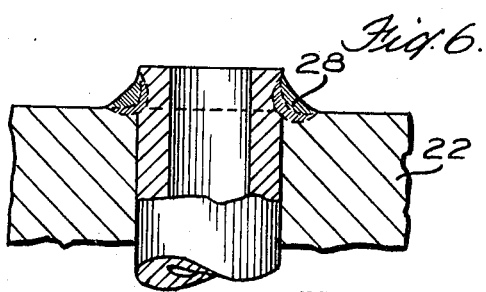

FIGS. 5 and 6 illustrate a two pass method in accordance with the invention and article obtained therefrom; and Referring to FIG. 1, illustrating a known process for welding tubes to a tube sheet, a steel tube sheet 12 is provided with a plurality of holes 14 into which "Monel" (67% nickel, 30% copper) tubes 16 are inserted. The steel has a melting temperature of about 2800° F. and "Monel" has a melting temperature of about 2460° F. A suitable welding torch, such as that shown in the Applett et al. Pat. No. 2,908,805, is used with an electrode directed towards the weld area. The electrode is rotated around each tube creating a first fusion weld 18. If desired, a ring (not shown) is then disposed around the tube directly against the tube, made out of a cupronickel alloy, (for instance, 70% copper, 30% nickel) melting at about 2250° F., and the fusion step is repeated, effecting a second weld 20. The purpose of the ring is to add filler metal to the weld and to extend the leak path of the total weld area.

In this known process, approximately the same amount of heat is put into the tube as into the tube sheet.

This method is repeated for each tube. As illustrated in FIG. 1, there is a slight penetration of fused metal into the tube and intergranular flow into the steel. It should be noted that the small difference in melting points between the base metal and tube metal (or filler ring metal) is necessary. Fusion of the "Monel" or copper-nickel only, the steel remaining in a non-fused state, permits intergranular flow of fused metal into the steel but avoids undesirable dilution of the steel, for instance, alloying of copper with the steel. The same results can be achieved between cupronickel tubes and a steel tube sheet.

EXAMPLE

Figure 2:
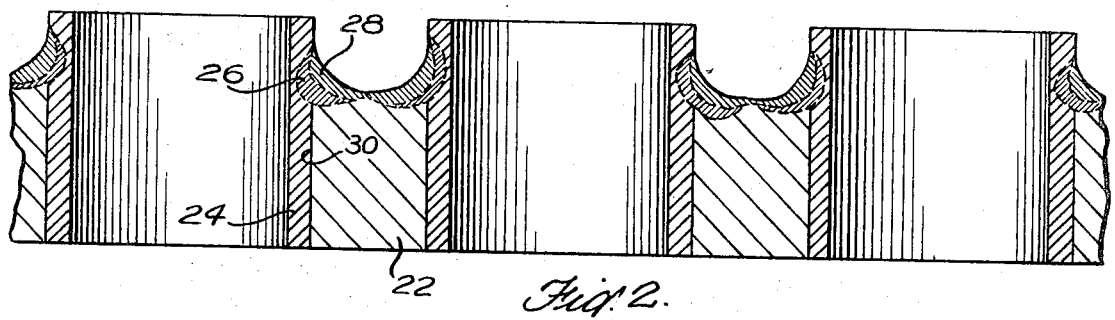
FIG. 2 illustrates a plurality of tube-to-tube sheet welds made in accordance with the present invention, between admiralty brass and steel, showing that welds of comparable quality are achieved in accordance with the concepts of the invention.
Figure 3:
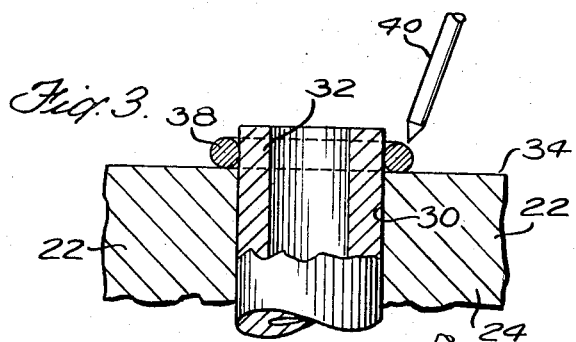
FIGS. 3 and 4 illustrate the method of the invention and article obtained therefrom.

Now referring to FIG. 2, there is shown a carbon steel tube sheet (M.P.—about 2800° F.) 22 to which tubes 24 of admiralty brass are joined. It will be shown that porosity free welds 26 and 28 having good and uniform penetration (by comparison with FIG. 1), and of comparable quality, can be made between these metals.

In this example, the steel has a composition which includes the following:

C: .35 max.      S: .040 max.
Mn: .4–.9        P: .040 max.
Si: .15–.35      V: nil The primary components of admiralty brass are 71% copper, 28% zinc and about 1% tin, and this metal starts to melt at 1650° F. and is molten at 1720° F. The tube diameters may be ⅝ to ¾ inches O.D. and make a close fit with the tube sheet holes. The tube wall thickness can be in the range from .049 to .072 inch.

As shown in FIGS. 3–6, the tubes 24 are inserted within the tube sheet holes 30 so that the ends 32 extend a short distance, for instance ⁷⁄₃₂ to ¼ inches, above the surface 34 of the tube sheet 22. A ¹⁄₁₆ inch diameter silver alloy ring 38 having the following composition Ag: 50           Cd: 16
Cu: 15½          Ni: 03
Zn: 15½ is positioned around the tube end 32 against the tube sheet surface 34. The melting point of the silver alloy is approximately 1170° F.–1270° F. The rings are prepared with an inside diameter about .000–010 inch smaller than the tube O.D., and larger or smaller cross-section diameters may be used.

Figure 4:
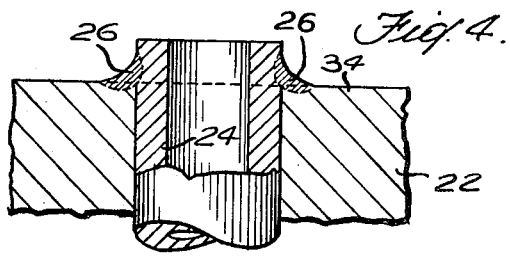

The torch 40, an inert-gas-shielded tungsten arc torch, is oriented towards the tube sheet at 15° plus or minus 2° with the vertical, or axis of the tube, and is positioned away from the tube sheet ³⁄₃₂ to ¼ inch depending upon tube and ring thicknesses; and away from the tube a distance sufficient so that the arc passes slightly along the outer side of the ring 38, the ring thereby shielding the tube from the arc and absorbing some of the arc heat. The degree of shielding and absorption of heat holds the temperature proximate the brass side of the weld probably at below 1663° F. the sublimation temperature of zinc, but high enough to achieve fusion bonding of the brass with the silver alloy. The temperature proximate the tube sheet side is probably higher, in the order of 2400° F. to 2600° F. A complete pass is made, in this example using manual control, completely fusing the ring 38, and the weld 26 of FIGS. 2 and 4 is obtained, having a satisfactory penetration into the tube 22 and intergranular flow of metal into the tube sheet surface 34. A second ring 42, of the same composition as ring 38, then is placed around the tube end as shown in FIG. 5, engaging the free end of the tube, and resting against the top edge of the weld 26. Again, the torch 40 is oriented toward the weld area and is positioned so that the ring 42 shields the tube end from the welding arc. A complete welding pass is made providing the fusion weld 28 illustrated in FIGS. 2 and 6.

The travel speed for welding is usually in the order of 15 to 17 seconds (for a ⅝" tube), and should be as fast as possible, commensurate with obtaining consistent fusion bonding of the silver alloy ring to the surface of the tube and the surface of the tube sheet. It should be noted that this speed is relatively high for processes of this type, the theory being that the low melting point and fluidity of the silver allows the operator to move fast. At the same time, the short dwell time prevents overheating of the admiralty brass, and also substantially prevents capillary flow of the silver alloy into the spacing between the tube and the tube sheet. In addition, the short dwell time prevents overheating of the silver alloy filler metal and excessive boiling of zinc (B.P.—1663° F.) in the alloy. Although zinc oxides do appear during welding as fumes and also as a deposit on the weld surface after completion of the weld cycle, no porosity results from dezincification since this evolution of fumes is not contained.

Both passes may be made with the tube sheet horizontal or vertically oriented. The current established used about 90 to 100 amps with a voltage of from 12 to 13 volts. An Argon and helium shielding gas mixture was used, and the tungsten electrode had a diameter of about ¹⁄₁₆ inch tapering to about .030 inch at the tip. No welding flux was used.

Following the welding steps, the tubes were rolled into tight engagement with the tube sheet, although the tubes may be rolled prior to welding. The sequence of first welding and then rolling prevents the formation of blow holes or porosity in the weld by gas or vapor trapped between the tube and the tube sheet.

It should be understood that the principles of the invention are applicable with various compositions of filler metal.

In general, the silver alloys should have appreciable quantities of zinc, cadmium, tin, manganese or nickel, and, in this respect, should have less than 60% silver. Thirty-five percent (35%) silver seems to represent a minimum for this metal. Silver alloys which contain phosphorous should not be used as the phosphorous alloys with iron of the steel base metal causing a brittle weld.

In general, any carbon steel can be used as a base metal.

Although the invention has been described with reference to specific embodiments, many variations will be apparent to those skilled in the art and with the scope of the following claims.

What is claimed is:

1. A method of welding admiralty brass tubes to a steel tube sheet comprising the steps of:
   providing a tube sheet with a hole therein;
   passing a tube through said hole in the tube sheet so that an end thereof projects beyond one surface of the tube sheet;
   placing a silver alloy ring against said surface and around the projecting part of the tube;
   striking an arc between a non-consumable tungsten arc welding electrode and the tube sheet, the electrode being aimed towards the tube sheet so that the ring shields the tube from the torch arc;
   rotating the electrode around the longitudinal axis of the tube and adjacent to said ring at a speed sufficient to avoid overheating the silver alloy to the point where it flows by capillary attraction between the tube and tube sheet, and to avoid overheating the admiralty brass to the point where the zinc therein vaporizes but slow enough to obtain consistent fusion bonding of the silver alloy with the base metals admiralty brass and steel.

2. A method according to claim 1 wherein the steel is a carbon steel and the silver alloy contains from 35 to 60% silver and appreciable quantities of at least one metal selected from the group consisting of zinc, cadmium, tin, manganese, and nickel, and combinations thereof.

3. A method according to claim 1 wherein the silver alloy has a melting point in the area of 1100° to 1300° F.

4. A method according to claim 1 wherein the steel is carbon steel and the silver alloy has composition

| | |
|---|---|
| Ag | 50 |
| Cu | 15½ |
| Zn | 15½ |
| Cd | 16 |
| Ni | 03 |

5. A method according to claim 1 wherein the torch has a rate of travel proportionate to 15 to 17 seconds per revolution for a ⅝ inch O. D. tube, and an angle of about 15° plus or minus 2° with the axis of the tube.

6. A method of welding admiralty brass tubes to a carbon steel tube sheet comprising the steps of providing a tube sheet having a hole therein;

passing a tube through said hole in the tube sheet so that an end thereof projects a short distance beyond one surface of the tube sheet;

placing a silver alloy ring of circular cross section having from 35–60% silver, appreciable quantities of at least one metal selected from the group consisting of zinc, cadmium, tin, manganese, and nickel and combinations thereof against said surface and around the projecting part of the tube;

striking an arc using an amperage of from 90 to 100 amps and a voltage of 12 to 13 volts between a non-consumable tungsten arc welding electrode and the tube sheet, the electrode being oriented at an angle in the order of 15° plus or minus 2° with the axis of the tube and spaced so that the arc path is through the outer portion of the ring;

shielding said arc path with an inert gas;

and rotating the electrode in a first pass around the tube at a speed of rotation equivalent to 15 to 17 seconds per revolution for a ⅝ inch O.D. tube, the speed being sufficient to avoid overheating the silver alloy to the point where it flows by capillary attraction between the tube and the tube sheet, and to avoid overheating the admiralty brass to the point where it becomes porous because of vaporization of the zinc in the brass but slow enough to obtain consistent fusion bonding of the silver alloy with the steel and admiralty brass.

7. A method according to claim 6 wherein the silver alloy has the composition

| | |
|---|---|
| Ag | 50 |
| Cu | 15½ |
| Zn | 15½ |
| Cd | 16 |
| Ni | 03 |

8. A method according to claim 6 wherein the silver alloy ring has a cross-section diameter of approximately 1/16 to 3/32 inches.

9. A method according to claim 6 wherein a second silver alloy ring identical to the first mentioned ring is preplaced around the tube and fused in a second weld pass, specifications for the first and second passes being the same.

References Cited

UNITED STATES PATENTS

| | | | |
|---|---|---|---|
| 3,118,052 | 1/1964 | Lippart et al. | 219—137 |
| 2,933,593 | 4/1960 | Edens et al. | 219—118 X |
| 2,962,306 | 11/1960 | Hawthorne | 219—137 X |

OTHER REFERENCES

Barnett: "Filler Metals for Joining," 1959 by Reinhold Publishing Co., pp. 194–6, 204–5 esp. table 196.

JOSEPH V. TRUHE, Primary Examiner

J. G. SMITH, Assistant Examiner

U.S. Cl. X.R.

219—118